US009804773B2

(12) United States Patent
Lee et al.

(10) Patent No.: US 9,804,773 B2
(45) Date of Patent: Oct. 31, 2017

(54) MULTI-TOUCH BASED DRAWING INPUT METHOD AND APPARATUS

(71) Applicant: Samsung Electronics Co., Ltd., Gyeonggi-do (KR)

(72) Inventors: Jaemyoung Lee, Seoul (KR); Saegee Oh, Gyeonggi-do (KR); Jinyoung Jeon, Seoul (KR); Hyunmi Park, Seoul (KR)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 184 days.

(21) Appl. No.: 13/952,776

(22) Filed: Jul. 29, 2013

(65) Prior Publication Data

US 2014/0028595 A1   Jan. 30, 2014

(30) Foreign Application Priority Data

Jul. 30, 2012  (KR) .................. 10-2012-0083020

(51) Int. Cl.
    *G06F 3/041*     (2006.01)
    *G06F 3/0488*    (2013.01)
(52) U.S. Cl.
    CPC ............. *G06F 3/04883* (2013.01); *G06F 2203/04808* (2013.01)
(58) Field of Classification Search
    None
    See application file for complete search history.

(56) References Cited

U.S. PATENT DOCUMENTS

| 6,377,240 B1 | 4/2002 | Baudel et al. |
| 6,628,279 B1 * | 9/2003 | Schell ................ G06F 3/04845 345/420 |
| 9,250,768 B2 | 2/2016 | Kim |
| 2001/0015718 A1 * | 8/2001 | Hinckley ............... A63F 13/06 345/156 |

(Continued)

FOREIGN PATENT DOCUMENTS

| CN | 101206545 A | 6/2008 |
| CN | 102999931 A | 3/2013 |
| KR | 10-2013-0092934 A | 8/2013 |

OTHER PUBLICATIONS

Merriam Webster's online dictionary definition of adjacent, https://www.merriam-webster.com/dictionary/adjacent, p. 1.*
Chinese Search Report, dated Jul. 3, 2017.

*Primary Examiner* — Ilana Spar
*Assistant Examiner* — Kirk Hermann
(74) *Attorney, Agent, or Firm* — Cha & Reiter, LLC

(57) ABSTRACT

The disclosure is a method and device for drawing a figure in correspondence to an input made with a first input tool and a second input tool to the terminal including an input unit capable of detecting physical touch and electrical input according to the present invention includes detecting a touch input made with the first and second input tools to the input unit; displaying at least one line movable according to contact points of the detected input on a display unit of the terminal; receiving a selection command based on the electrical input made with at least one of the first and second input tools; and displaying one of the at least one line as the line of which at least one of length and direction is fixed.

22 Claims, 10 Drawing Sheets

(56) References Cited

U.S. PATENT DOCUMENTS

| | | | |
|---|---|---|---|
| 2005/0140677 A1* | 6/2005 | Chou | G06F 3/04845 |
| | | | 345/441 |
| 2006/0008779 A1* | 1/2006 | Shand | G09B 19/00 |
| | | | 434/90 |
| 2007/0165034 A1* | 7/2007 | Mielke | G06F 17/30905 |
| | | | 345/475 |
| 2009/0171371 A1* | 7/2009 | Nixon | A61B 19/2203 |
| | | | 606/130 |
| 2009/0228842 A1* | 9/2009 | Westerman | G06F 3/04883 |
| | | | 715/863 |
| 2010/0079405 A1* | 4/2010 | Bernstein | G06F 3/04883 |
| | | | 345/174 |
| 2010/0149109 A1* | 6/2010 | Elias | G06F 3/04845 |
| | | | 345/173 |
| 2011/0169748 A1* | 7/2011 | Tse | G06F 3/0425 |
| | | | 345/173 |
| 2011/0175821 A1* | 7/2011 | King | G06F 3/04883 |
| | | | 345/173 |
| 2012/0182241 A1 | 7/2012 | Molino et al. | |
| 2012/0194484 A1* | 8/2012 | Lehman | 345/179 |
| 2012/0262484 A1* | 10/2012 | Gottfeld | G09B 5/065 |
| | | | 345/632 |
| 2013/0016126 A1* | 1/2013 | Wang | G06F 3/041 |
| | | | 345/650 |
| 2013/0106912 A1* | 5/2013 | Um | 345/649 |
| 2013/0321350 A1 | 12/2013 | Mesaros et al. | |
| 2014/0029815 A1 | 1/2014 | Kadir et al. | |

\* cited by examiner

MULTI-TOUCH BASED DRAWING INPUT METHOD AND APPARATUS

CROSS RELATED APPLICATION

This application claims the benefit of priority under 35 U.S.C. §119(a) of a Korean patent application filed on Jul. 30, 2012 in the Korean Intellectual Property Office and assigned Serial No. 10-2012-0083020, the entire disclosure of which is hereby incorporated by reference.

BACKGROUND

Field of the Invention

The present disclosure relates to a multi-touch based geometrical figure drawing method and apparatus. In particular, the present disclosure relates to a method and apparatus for drawing a geometrical figure such as line, arc, and circle through multi-touch gesture made on an input unit.

Description of the Related Art

In the conventional terminal equipped with an input unit capable of recognizing user's touch gesture, it is typical to enter a figure-recognition input mode in order to recognize a figure drawn by the user and display the recognized figure.

In the case of drawing a circle, the terminal enters the circle input mode and receives the user input on the center and radius to draw a circle based on the information.

Also, in order to draw a straight line, the terminal enters the line input mode, receives the user input on the start and end points to draw the straight line.

When the user wants to draw an arc, it is accomplished by selecting a part of a pre-drawn circle or drawing a line connecting two points around a reference point.

Since the conventional terminal has to enter a certain operation mode to receive a user input for drawing a figure, this increases the number of steps for drawing the figure, resulting in increase of manipulation complexity.

SUMMARY

The present invention has been made in an effort to solve the above problem and it is an object of the present invention to provide a mobile terminal and audio processing method thereof that is capable of processing the received audio signal in adaptation to the hearing characteristic of the user (particularly, hearing-impaired user).

The present invention has been made in an effort to solve the above problem and it is an object of the present invention to provide a figure drawing method and apparatus of a touch-enabled terminal that is capable of allowing the user to draw a geometrical figure such as line, circle, and arc with a multi-touch gesture without entering a specific figure drawing mode.

It is another object of the present invention to provide a figure drawing method and apparatus of a touch-enabled terminal that is capable of drawing figures such as a line, circle, and arc selectively by inputting position information with a touch gesture having two or more contact points, resulting in improvement of manipulation efficiency.

In accordance with an aspect of the present invention, a method for drawing a figure in correspondence to an input made with a first input tool and a second input tool to the terminal including an input unit capable of detecting physical touch and electrical input includes detecting a touch input made with at least one of the first input too and the second input tool to the input unit; displaying at least one line movable according to contact points of the detected input on a display unit of the terminal; receiving a selection command based on an electrical input made with at least one of the first and second input tools; and displaying one of the at least one line as the line of which at least one of length and direction is fixed.

In accordance with another aspect of the present invention, a terminal drawing a figure based on a user input includes an input unit which detects at least one of physical touch and electrical input; a display unit which displays an image based on an input on the input unit; and a control unit which controls detecting a touch input made with the first and second input tools to the input unit; displaying at least one line movable according to contact points of the detected input on a display unit of the terminal; receiving a selection command based on the electrical input made with at least one of the first and second input tools; and displaying one of the at least one line as the line of which at least one of length and direction is fixed.

DETAILED DESCRIPTION

Figure 1:
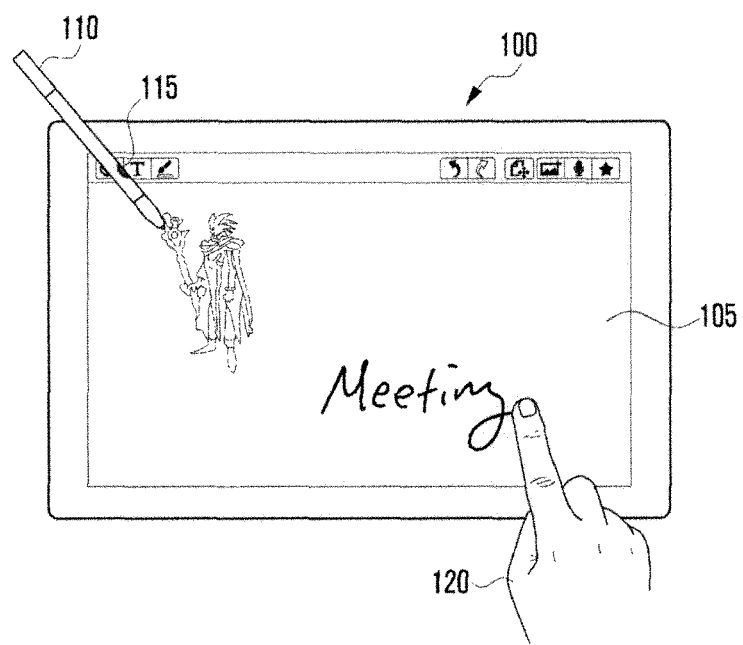
FIG. 1 is a diagram illustrating a situation of touch gesture input with various tools on the touch-enabled terminal according to an embodiment of the present invention.

Exemplary embodiments of the present invention are described with reference to the accompanying drawings in detail. For the purposes of clarity and simplicity, detailed description of well-known functions and structures incorporated herein may be omitted to avoid obscuring the subject matter of the present invention.

For the same reason, some of elements are exaggerated, omitted or simplified in the drawings and the elements may have sizes and/or shapes different from those shown in drawings, in practice. The same reference numbers are used throughout the drawings to refer to the same or like parts.

FIG. 1 is a diagram illustrating a situation of touch gesture input with various tools on the touch-enabled terminal according to an embodiment of the present invention.

Referring to FIG. 1, a terminal 100 according to an embodiment of the present invention is capable of receiving a touch gesture made with a both a first input tool 110 and a second input tool 120. The terminal 100 is capable of displaying a line drawn in accordance with an input signal from the first input tool 110 and/or the second input tool 12 corresponding to a touch gesture by means of a display unit 105. An input unit 210 for receiving the input gesture made by the first and second input tools 110 and 120 is arranged to face the same direction as the surface of the display unit 105 such that the result of the input made by means of the input tool is displayed on the display unit 105.

Figure 2:
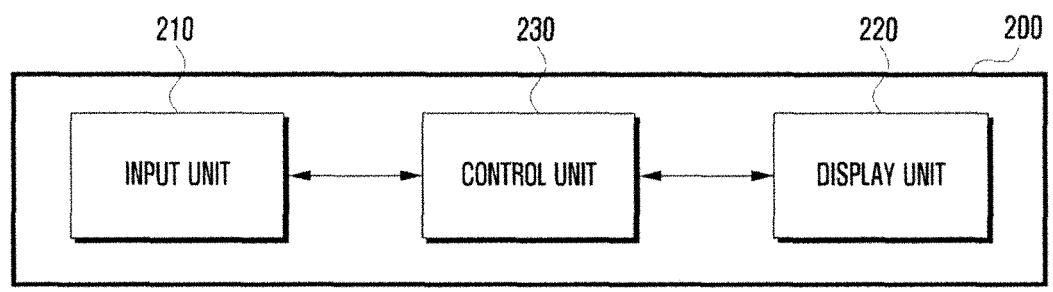
FIG. 2 is a block diagram illustrating the configuration of the terminal of FIG. 1.

The first input tool 110 may be used to make a touch gesture on the input unit 210 (see FIG. 2). A touch recognition device recognizes the contact points and movement distance based on the pressure or electrical input applied to the input unit 210.

The first input tool 110 may include a selector 115, which may be in the form of a button, sensor, or other user selectable device. The selector 115 may change the pattern of the electrical input applied by the first input tool 110 according to the user's selection. In detail, the electrical input may have a frequency of an electrical vibration or signal generated by the selector 115. According to an embodiment of the present invention, the input unit 120 may include at least one antenna capable of checking the frequency and origin of the electrical vibration.

According to an embodiment of the present invention, the first input tool 110 may be a tablet pen or stylus, and the selector 115 may be a button which is pushed on/off by a user to generate electrical vibrations of distinct frequencies. The input unit may check different origin and number of frequency changes. If the user activates, by e.g., clicking, the selector 115, the input unit 210 is capable of checking the clicked position and number of clicked times and, if the first input tool 110 moves in the state that it is contacted to the input unit 120 and the selector is clicked, tracing the movement path. Accordingly, the user may make a drag or double click gesture and thus the input unit is capable of detecting the corresponding user input.

In one embodiment of the present invention, the input unit 210 is additionally capable of receiving an input made with the second input tool 120. The second input tool 120 may be a part of the human body (preferably one or more fingers) or a physical object, and the input unit 210 may be implemented with a resistive type touch panel for sensing pressure or a capacitive type touch panel for sensing the change of capacitance caused by the touch. In other embodiments, the second input tool 120 may be a second pen or stylus, similar to the first input tool 110, and the input unit 210 is capable of distinguishing between inputs from the first input tool 110 and the second input tool 120. It is also considered within the scope of the invention to provide the input unit 210 with both a resistive type touch panel as well as a capacitive touch panel for detecting inputs from different types of input tools 110, 120.

The input unit 210 is preferably capable of detecting the touch gestures made with both the first and second input tools 110 and 120 simultaneously and sensing the electric vibration input by the first input tool 110 which varies depending on whether the selector 115 is selected.

Although the description is directed to the case where the display unit 105 and the input unit 210 are arranged in parallel or integrated into the same physical structure, such that a line is drawn on the display unit 105 in correspondence to the user input made with the input tool, it is possible to draw a link corresponding to the input gesture detected by the a separate input unit on the display unit. More particularly, the terminal 100 may be provided with an extra tablet input unit, such as an external touchpad or even a conventional pointing device, and display the figure input through the tablet input unit on a monitor as a separate display unit.

Although the description is directed to the case where the first and second input tools 110 and 120 are used for gesture input, it is additionally considered within the scope of the invention to change the relative positions of the two tools and the gesture taken with one tool may be replaced by that of the other tool through design change.

FIG. 2 is a block diagram illustrating a preferable configuration of the terminal of FIG. 1.

As shown in FIG. 2, the terminal according to an embodiment of the present invention includes an input unit 210, a display unit 220, and a control unit 230, or any combination thereof. The control 230 unit typically contains a processor or microprocessor.

The input unit 210 is capable of detecting a touch gesture made with multiple input tools. For example, the touch gesture may be detected by one of the capacitive and resistive panels. If an electrical vibration with a predetermined frequency is generated by an input tool 110, 120, the input unit 210 acquires the information on the electrical vibration frequency, input tool contact point, frequency change, contact point change, etc.

If a touch gesture is made with an input tool 110, 120 on the input unit 210, the input unit 210 checks the contact point(s) of the touch gesture. If the input tool moves while contacting the input unit 210, the input unit 210 is capable of tracking the change of the contact point(s) and movement direction and speed. The input unit 210 is also capable of checking the electrical vibration frequency and change of the frequency generated by a selector 115 of the input units 210.

The display unit 220 is capable of displaying an image input through the input unit 210 and determined by the control unit 230. The display unit 220 may be implemented with any of commercial display panels such as Liquid Crystal Display (LCD) and Active Matrix Organic Light Emitting Display (AM-OLED) or any other display panel technology, as the present invention is not limited by the technology used therein.

The control unit 230 is capable of analyzing the input gesture made on the input unit 210 and calculating other values. The control unit 230 is also capable of controlling the display unit 220 to display the calculation result values.

More particularly, if a multi-touch gesture having multiple contact points is made on the input unit 210, the control unit 230 calculates the distances between the contract points and directions connecting paired contact points. The display unit 220 may display a line or an image corresponding to the touch gesture. When displaying the data corresponding to the input gesture detected by the input unit 210, the control unit 230 is capable of matching the position on the input unit 220 to the position on the display unit 220 according to a predetermined coordinate system.

Figure 3:
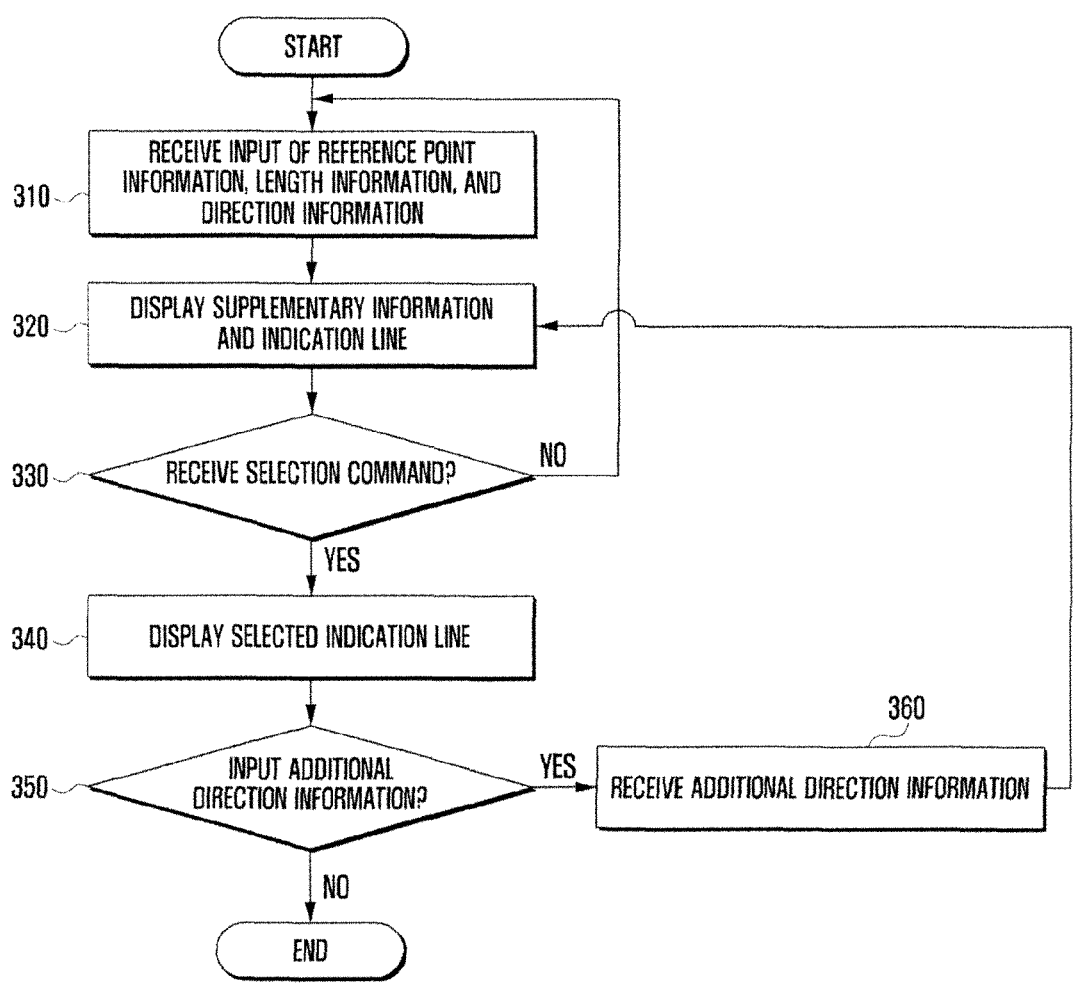
FIG. 3 is a flowchart illustrating the procedure of drawing a link in the touch-based drawing input method according to an embodiment of the present invention.

FIG. 3 is a flowchart illustrating the procedure of drawing a link in the touch-based drawing input method according to one embodiment of the present invention.

Referring to FIG. 3, the terminal 100 receives a touch gesture having at least one of reference point information, length information, and direction information through the input unit 210 at step 310.

In this embodiment, if a touch gesture having two contact points is detected, the coordinates of at least one of the contact points may be used as the reference point. The distance between the two contact points may be used as the length information, and direction of the line connecting the two contact points may be used as the direction information.

At step 320, The control unit 230 displays supplementary information and indication line based on at least one of the reference point information, length information, and direction information.

In one embodiment of the present invention, the supplementary information may include, when the touch gesture has two contact points, the line connecting the two contact points, a circle having the line connecting the two contact points as its radius, and a distance between the two contact points. The line connecting the two contact points and the circle having the line connecting the two contact points as its radius may be presented as dotted lines on the display unit 220. The line connecting the two contact points is referred to as indication line.

At step 330, the control unit 230 determines whether a selection command is received through the input unit 210. The selection command may be input by input tool in such a way of making the touch more than one time at the same position, changing the frequency of the electric vibration more than one time, or releasing the contact of the input tool.

If no selection command is input, the control unit 230 returns the procedure to step 310 to acquire at least one reference information, length information, and display the supplementary information and indication line according to the acquired information.

At step 340, if the selection command is received, the control unit 230 controls the display unit 220 to show the selected indication line. In one embodiment of the present invention, the selected indication line may be the segment connecting the two contact points of the multi-touch gesture. The segment connecting the two contact points can presented as a dotted line initially and then changed, if selected by the selection command, for a solid line at step 340.

At step 350, the input unit 210 can determine whether additional direction information is input. The additional direction information may be input with a touch gesture made for correcting the indication line selected at step 340. At step 360, if additional direction information is input, the control unit 230 preferably acquires the additional input information and returns the procedure to step 320 to display the changed supplementary information and the changed dotted line.

According to one embodiment of the present invention, the additional direction information may be input with a drag gesture starting from one end point of the selected indication line. The drag gesture may be completed by matching the electrical vibration generated by the input tool with a predetermined frequency and then makes a touch gesture. By making a touch input in this way, it is possible to correct or change the direction of the selected indication line.

Figure 4:
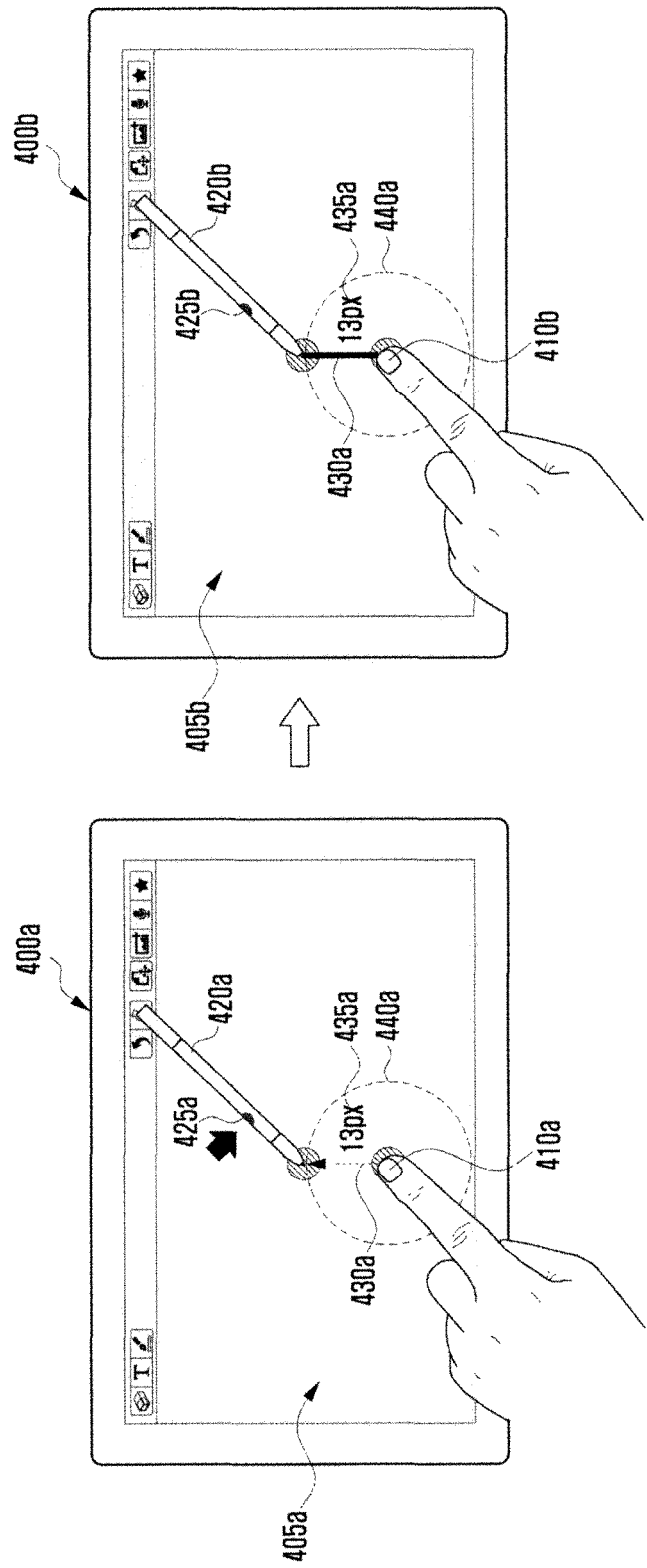
FIG. 4 is a diagram illustrating an exemplary situation of drawing a straight line with a touch-based drawing input on the terminal according to an embodiment of the present invention.

FIG. 4 is a diagram illustrating an exemplary situation of drawing a straight line with a touch-based drawing input on the terminal according to an embodiment of the present invention.

Referring to FIG. 4, the user may make a touch gesture with the first and second input tools 410 and 420 on the display unit 405 of the terminal 400.

The first input tool 410 may make a touch input while the second input tool 420 makes anther touch input or electrical input onto the terminal 400. The electrical input is of generating one of distinct electrical vibrations to the terminal 400. The distinct electrical vibrations are generated selectively by selector 425.

In an embodiment of the present invention, if a touch gesture is made with the first and second input tools 420a and 320b, the control unit 230 can control the display unit 220 to show the supplementary information 435a and 440a and the indication line 430a. The indication line 430a may be a dotted line connecting the contact points of the touch gesture. The supplementary information 435a and 440a may include the dotted line circle having the indication line as its radius and the length information on the indication line. The supplementary information 435a and 440a may vary as the contact points of the touch gesture change.

If a user executes a command for selecting the indication line 430a, the control unit 230 controls the terminal such that the indication line 430a is changed for a solid line. The selected indication line 430a may be the segment connecting the two contact points of the touch gesture. The supplementary information 435a and 440a may be displayed continuously even after the selection command is input. The selection command may be input by pushing the selector 425b or by releasing the contact of one of the first and second input tools 410b and 420b from the terminal 400b.

The terminal 400b may receive the additional direction information input by through of one of the first and second input tools 410b and 420b, even after displaying the selected indication line 435b and correcting the direction of the indication line 345b selected based on the additional direction information.

According to one embodiment of the present invention, the terminal 400 receives the touch gesture made with the first and second input tools 410a and 420b. The touch gesture is made by the user activating on the selector 425a, preferably wherein the selector 425a is a button and the button is depressed. The display unit 405a may display at least one of the indication line 430a connecting the two contact points of the touch gesture, length information 435a, and dotted line circle 440a.

The user may input the selection command to the terminal 400b by releasing the selector 425b. The display unit 405b is capable of displaying the indication line 435b selected by the selection command in the form of a solid line. If one of the contacts of first and second input tools 410b and 420b is released after the input of the selection command, the display unit 405b can hide the supplementary information 435b and 440b and show only the indication line 430b.

According to another embodiment of the present invention, the selection command may be generated by releasing the contact of one of the first and second input tools 410b and 420b without manipulation of the selector 425b.

Figure 5:
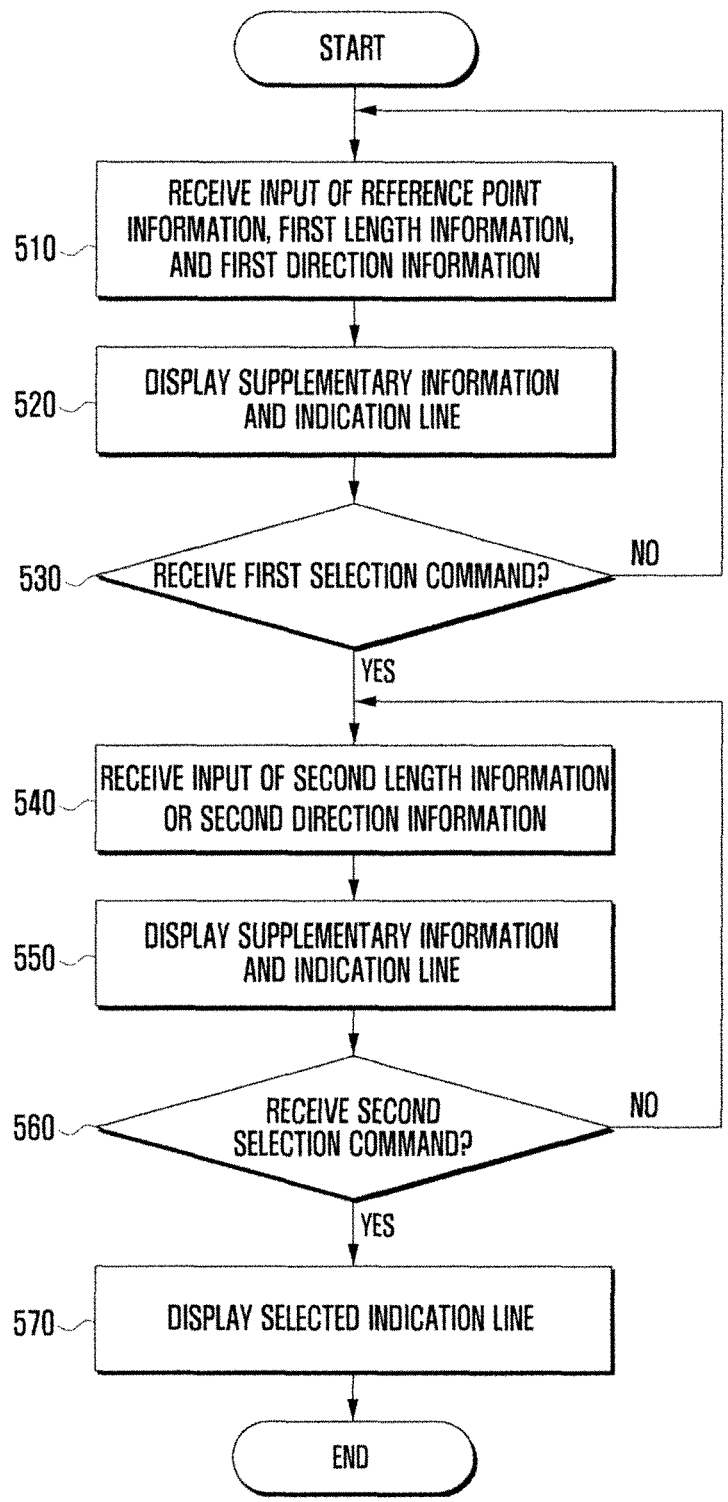
FIG. 5 is a flowchart illustrating the procedure of drawing a figure in the touch-based drawing input method according to another embodiment of the present invention.

FIG. 5 is a flowchart illustrating the procedure of drawing a figure in the touch-based drawing input method according to another embodiment of the present invention.

At step 510, the terminal 200 receives a touch gesture having at least one of reference point information, length information, and direction information through the input unit 210 at step 510.

In one embodiment of the present invention, if a touch gesture having two contact points is detected, the coordinates of at least one of the contact points may be used as the reference point. The distance between the two contact points may be used as first length information, and direction of the line connecting the two contact points may be used as the first direction information.

At step 520, the control unit 230 controls the display unit 220 to display the supplementary information and indication line based on at least one of the reference point information, the first length information, and the first direction information.

In one embodiment of the present invention, the supplementary information may include, when the touch gesture has two contact points, the line connecting the two contact points, circle having the line connecting the two contact points as its radius, and distance between the two contact points. The line connecting the two contact points and the circle having the line connecting the two contact points as its radius may be presented as dotted lines on the display unit 220. The line connecting the two contact points is referred to as indication line.

At step 530, the control unit 230 determines whether a first selection command is received through the input unit 210. The first selection command may be input by use of the input tool in such a way of making the touch more than one time at the same position, changing the frequency of the electric vibration more than one time, or releasing the contact of the input tool. The indication line may be selected by the first selection command. If the indication line is selected, the procedure advances to the next step based on the indication line and, if the first selection command is not received, the procedure returns to step 510 to acquire the reference point information, first length information, and second length information from a touch input.

At step 540, if the first selection command is received, the control unit 230 acquires the second length information of the second direction information input. The second length information and the second direction information may include the relative length from one of the both ends of the selected indication line based on the touch input detected by the input unit 210.

The display unit 220 may display the supplementary information and indication line based on the second length information or the second direction information. The indication line may be an arc as a part of the circle having the indication line selected based on the second length information or the second direction information as its radius. The supplementary information may be the value indicating the center angle of the arc as a part of the circle having the indication link selected based on the second length information or the second direction information as its radius.

At step 560, the control unit 230 determines whether the second input is received through the input unit 210 at step 560. The second selection command may be input in the same way as the first selection command and, if no selection command is received, the input unit 210 receives the second length information on the second direction information.

At step 570, if the second selection command is received, the control unit controls the display unit 220 to display the indication line selected by the second selection command.

Figure 6:
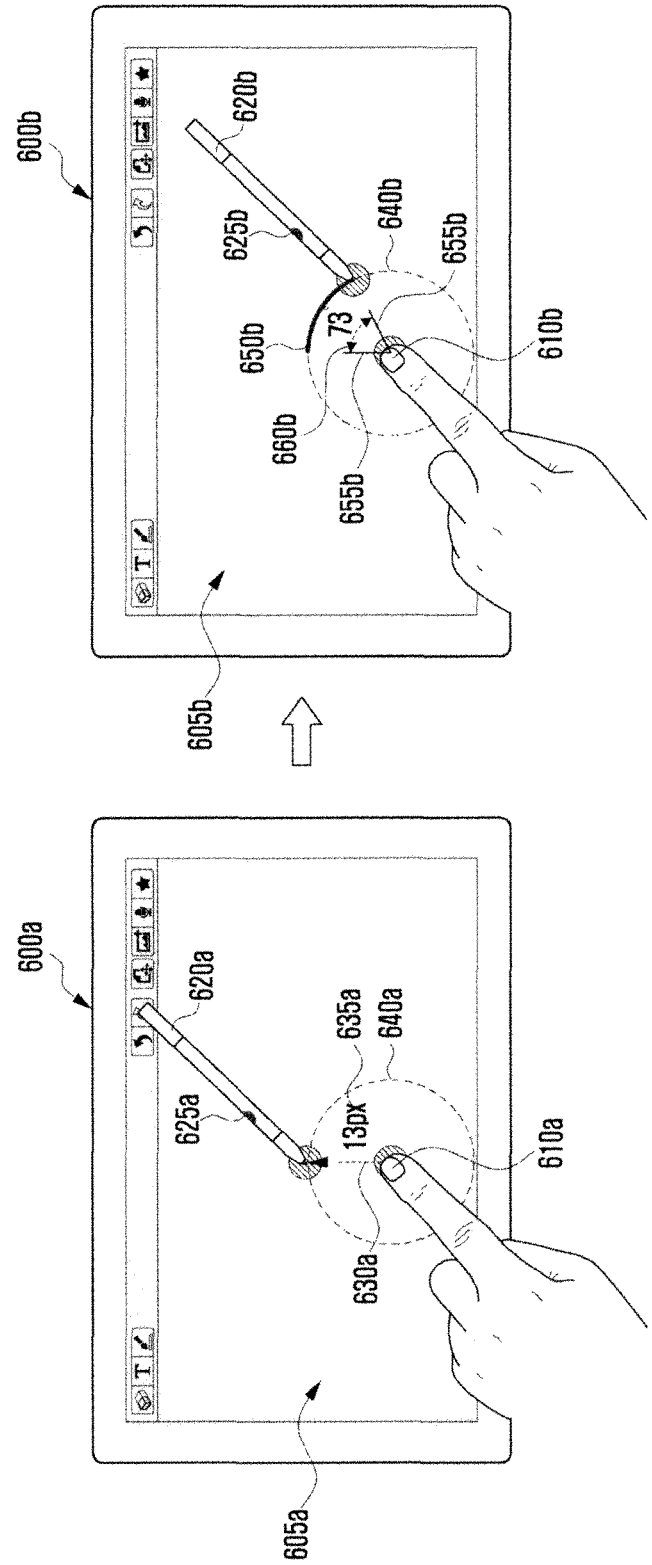
FIG. 6 is a diagram illustrating an exemplary situation of drawing a figure with a touch-based drawing input on the terminal according to an embodiment of the present invention.

FIG. 6 is a diagram illustrating an exemplary situation of drawing a figure with a touch-based drawing input on the terminal according to an embodiment of the present invention.

Referring to FIG. 6, the user may make a touch gesture with the first input tool 610 and the second input tool 620 on the display unit 605 of the terminal 600.

The first input tool 610 may make a touch input while the second input tool 620 makes another input or electrical input onto the terminal 600. The electrical input is of generating one of distinct electrical vibrations to the terminal 600. The distinct electrical vibrations are generated selectively by selector 625.

In one embodiment of the present invention, if a touch gesture is made with the first and second input tools 620a and 620b, the control unit 230 controls the display 220 to show the supplementary information 635a and 640a and the indication line 630a. The indication line 630a may be a dotted line connecting the contact points of the touch gesture. The supplementary information 635a and 640a may include the dotted line circle having the indication line as its radius and the length information on the indication line. The supplementary information 435a and 440a may vary as the contact points of the touch gesture change.

If a user command for selecting the indication line 430a is input, the control unit 230 changes indication line 430a into a solid line. The selected indication line 430a may be the segment connecting the two contact points of the touch gesture.

The terminal 600b may receive the second length information or the second direction information. The second length information or the second direction information may be determined depending on the relationship between one of the end points of the selected indication line 435a and the contact point of the new touch gesture.

In one embodiment of the present invention, the second length information or the second direction information may be the touch input made with the second input tool 620b on the dotted line circle 640b. The control unit 230 controls the display 220 to show the indication line 650b and the supplementary information 655b and 660b forming the angle corresponding to the indication line 650b according to the second length information or the second direction information. According to an embodiment of the present invention, the indication line 650 may be expressed as a dotted line.

The control unit 230 may select the indication line arc 650b in response to a second selection command. In this way, the user can draw an arc having a specific radius.

According to another embodiment of the present invention, a touch gesture is made with the first and second input tools 610a and 620a. The touch gesture may be made in the state that the selector 625a is pushed on. If the selector 625a is switched off by the user, the terminal 600a receives the first selection signal. In response to the first selection signal, the first segment connecting the contact points of the first and second input tools 610a and 620a is determined.

The terminal 600b may acquire the second length information or the second direction information based on the first segment. The second length information or the second direction information may be acquired as the relative position to one end of the first segment based on the touch input made with the second input tool 620b, and an indication line is expressed in the form of an arc based on the second length information or the second direction information. The arc as the indication line may be an arc of the circle having the first segment as its radius or an arc having a radius corrected according to the second length information or the second direction information. The second selection input may be made in such a way of input the second length information or the second direction information in the state that the selector 625b is off and then releasing the contact of the second input tool 620b. The indication line in the form of an arc is selected in this way, and the supplementary information 655b and 660b may be hidden on the display unit 605b according to the second selection command.

According to one embodiment of the present invention, the positions of the first and second input tools 620a and 620b may be changed, and the user may input the second length information or the second direction information with the first input tool 610b in the state that the second input tool 620b maintains the contact to the center point of the arc.

Figure 7:
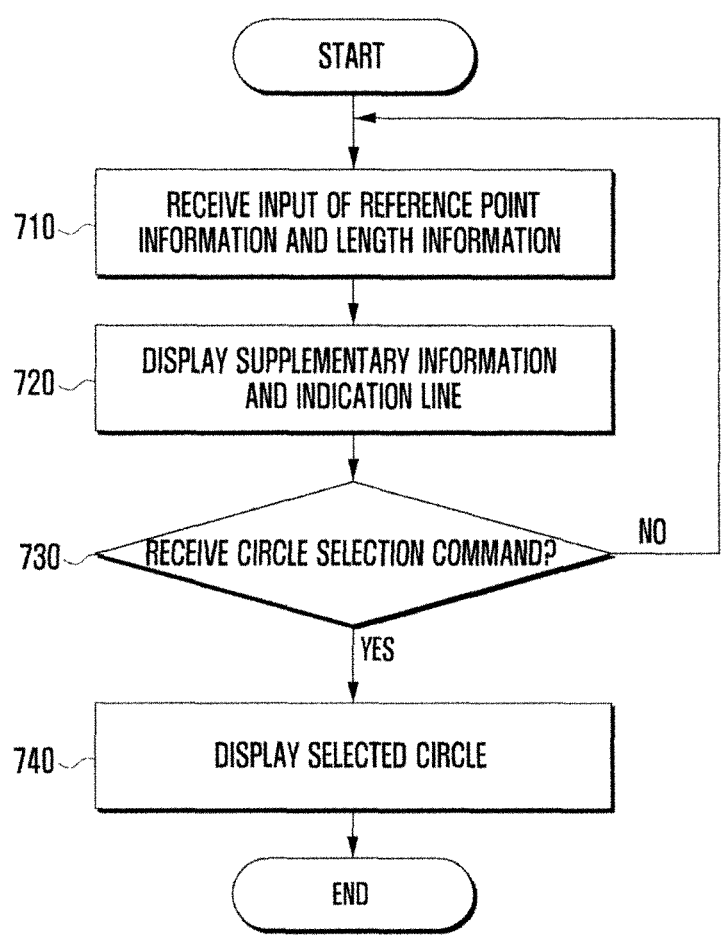
FIG. 7 is a flowchart illustrating the procedure of drawing a figure in the touch-based drawing input method according to another embodiment of the present invention.

FIG. 7 is a flowchart illustrating the procedure of drawing a figure in the touch-based drawing input method according to another embodiment of the present invention.

Referring to FIG. 7, at step 710, the terminal 200 receives a touch gesture having at least one of reference point information, length information, and direction information through the input unit 210.

In one embodiment of the present invention, if a touch gesture having two contact points is made, the coordinates of the two contact points may be used as the reference points. Also, the distance between two contact points may be used as the length information, and the direction of the line connecting the two contact points may be used as the direction information.

At step 7210, the control unit 230 may control the display unit 220 to display the supplementary information and indication line based on at least one of the reference point information, the first length information, and the direction information.

In one embodiment of the present invention, the supplementary information may include, when the touch gesture has two contact points, the line connecting the two contact points, a circle having the line connecting the two contact points as its radius, and distance between the two contact points. The line connecting the two contact points and the circle having the line connecting the two contact points as its radius may be presented as dotted lines on the display unit 220. The line connecting the two contact points is referred to as indication line.

At step 730, the control unit 230 determines whether a command for selecting the circle is input through the input unit 210. The circle selection command may be input by the input tool in such a way of making the touch more than one time at the same position, changing the frequency of the electric vibration more than one time, or releasing the contact of the input tool. If the circle selection command is not received, the procedure returns to step 710 to acquire the reference point information and the length information.

If the circle selection command is received, the control unit 230 controls the terminal to display the selected circle.

Figure 8:
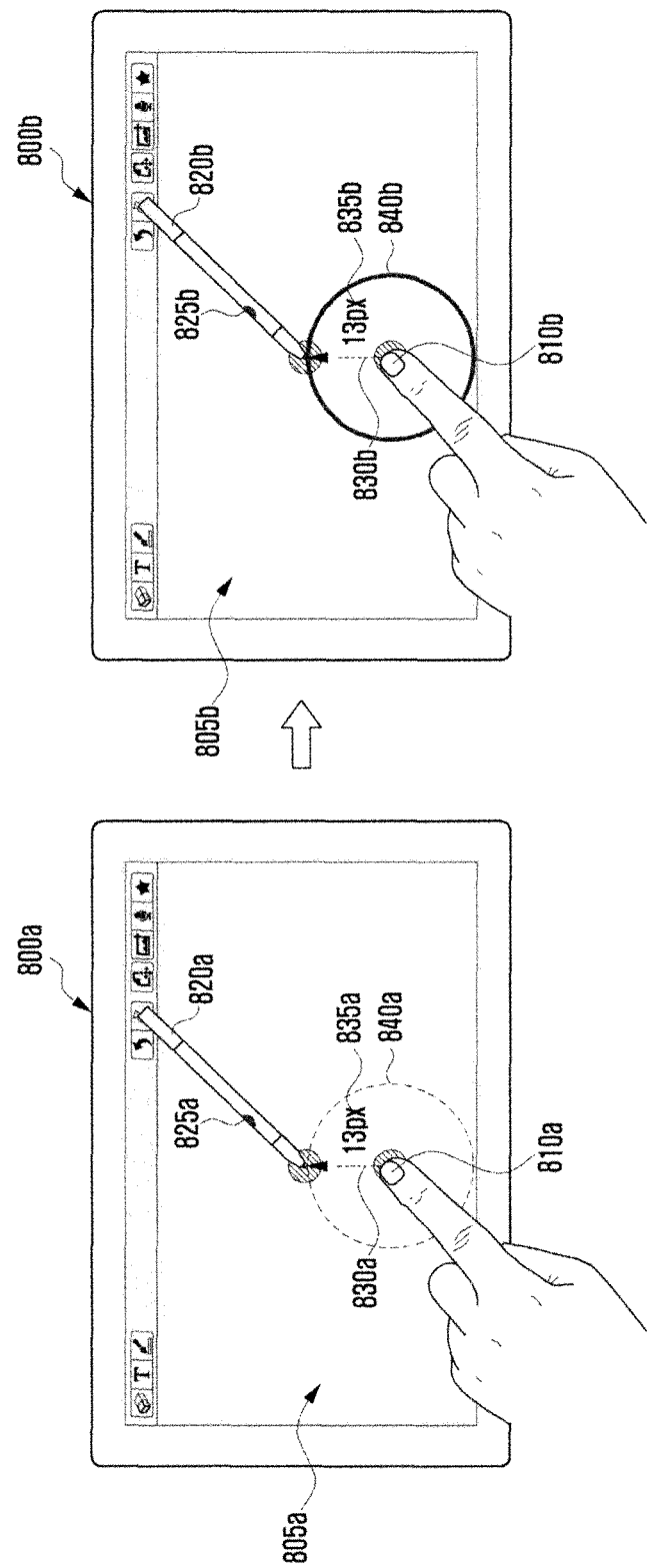
FIG. 8 is a diagram illustrating an exemplary situation of drawing a figure with a touch-based drawing input on the terminal according to an embodiment of the present invention.

FIG. 8 is a diagram illustrating one exemplary situation of drawing a figure with a touch-based drawing input on the terminal according to one embodiment of the present invention.

Referring to FIG. 8, the user may make a touch gesture with the first input tool 810 and the second input tool 820 on the display unit 805 of the terminal 800.

The first input tool 810 may make a touch input, and the second input tool 820 makes another input or electrical input onto the terminal 800. The electrical input is typically of generating one of distinct electrical vibrations to the terminal 800. The distinct electrical vibrations are preferably generated selectively by selector 825, which is typically in the form of a button.

In one embodiment of the present invention, if a touch gesture is made with the first and second input tools 820a and 820b, the control unit 230 controls the terminal to display supplementary information 835a and 840a and the indication line 830a. The indication line 830a may be a dotted line connecting the contact points of the touch gesture. The supplementary information 835a and 840a may include the dotted line circle having the indication line as its radius and the length information on the indication line. The supplementary information 835a and 840a may vary as the contact points of the touch gesture change.

The circle 840b may be selected by a user command. If the circle selection command is detected, the control unit 230 controls the terminal such that the dotted line circle 840a having the indication line 830b as its radius is changed for a solid line circle 840b.

According to one embodiment of the present invention, the terminal 800a may receive a touch gesture made with the first and second input tools 820a and 820b. Touch input is input in the state that the selector is on. The display unit 805a is capable of displaying at least one of the indication line 830a connecting both the end points of the touch input, length information 835a, and dotted line circle 840a. The selection command may be generated in such a way of switching on/off the selector at least once and, preferably, double-clicking the selector. In response to the selection command, the circle having the indication line 830b as its radius is selected such that the dotted line circle 840a is changed for the solid line circle 840b.

Figure 9:
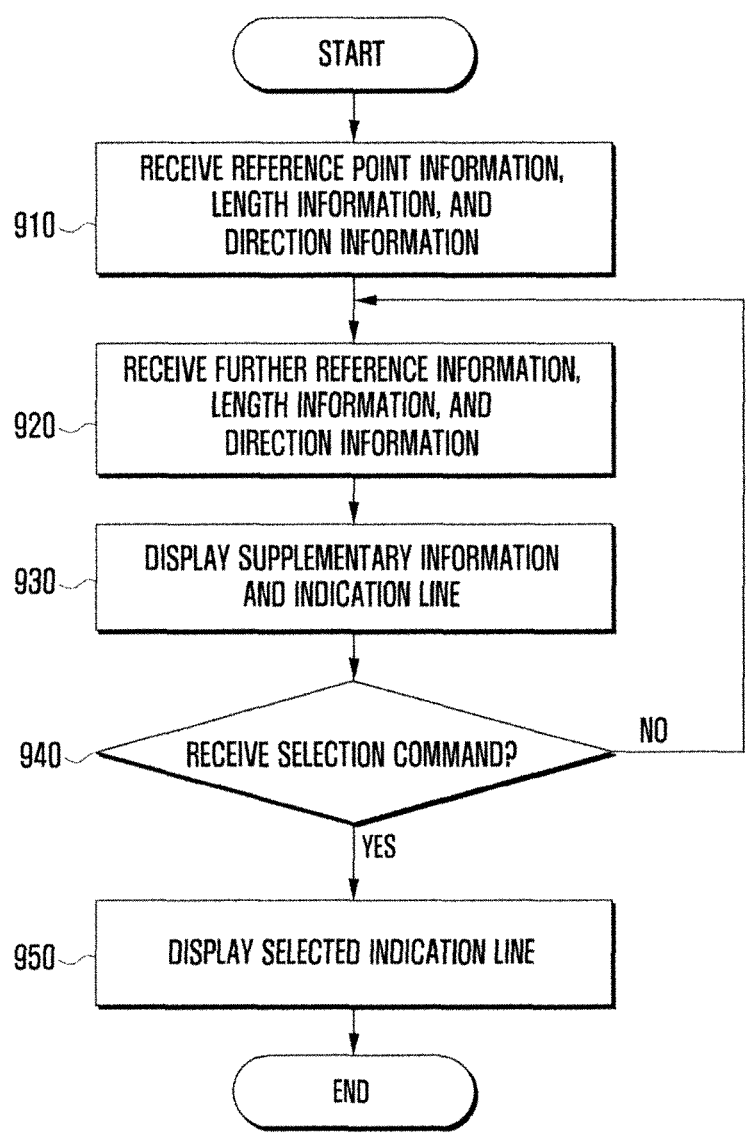
FIG. 9 is a flowchart illustrating the procedure of drawing a figure in the touch-based drawing input method according to another embodiment of the present invention.

FIG. 9 is a flowchart illustrating the procedure of drawing a figure in the touch-based drawing input method according to another embodiment of the present invention. At step 910, the terminal 200 receives a touch gesture having at least one of reference point information, length information, and direction information through the input unit 210.

In one embodiment of the present invention, if a touch gesture having two contact points is detected, the coordinates of the two contact points may be used as the reference points. Also, the distance between two contact points may be used as the length information, and the direction of the line connecting the two contact points may be used as the direction information.

At step 920, the terminal 200 may further receive at least one of reference point information, length information, and direction information through the input unit 210.

The control unit 230 may control the display unit 220 to display the supplementary information and indication line at step 930, based on at least one of the reference information, length information, and direction information acquired at steps 910 and 920.

In one embodiment of the present invention, the supplementary information may include, when the touch gesture has two contact points, the line connecting the two contact points, a circle having the line connecting the two contact points as its radius, and a distance between the two contact points. The line connecting the two contact points and the circle having the line connecting the two contact points as its radius may be presented as dotted lines on the display unit 220. The line connecting the two contact points is referred to as indication line. The reference points acquired at step 920 are also connected in the same way to display the corresponding the supplementary information and indication line.

The control unit 230 determines whether a selection command is input through the input unit 210. The selection command may be input by means of an input means in such a way of making the touch more than one time at the same position, changing the frequency of the electric vibration more than one time, or releasing the contact of the input tool.

If the selection command is not received, the procedure returns to step 920 to acquire the reference point information, the length information, and direction information and display the supplementary information and indication line based on the acquired information.

If the selection command is received, the control unit 230 controls the terminal such that the selected indication line is displayed at step 950. In one embodiment of the present invention, the selected indication line may be the segment connection the two points which is changed from the dotted line to the solid line according to the selection command.

Figure 10:
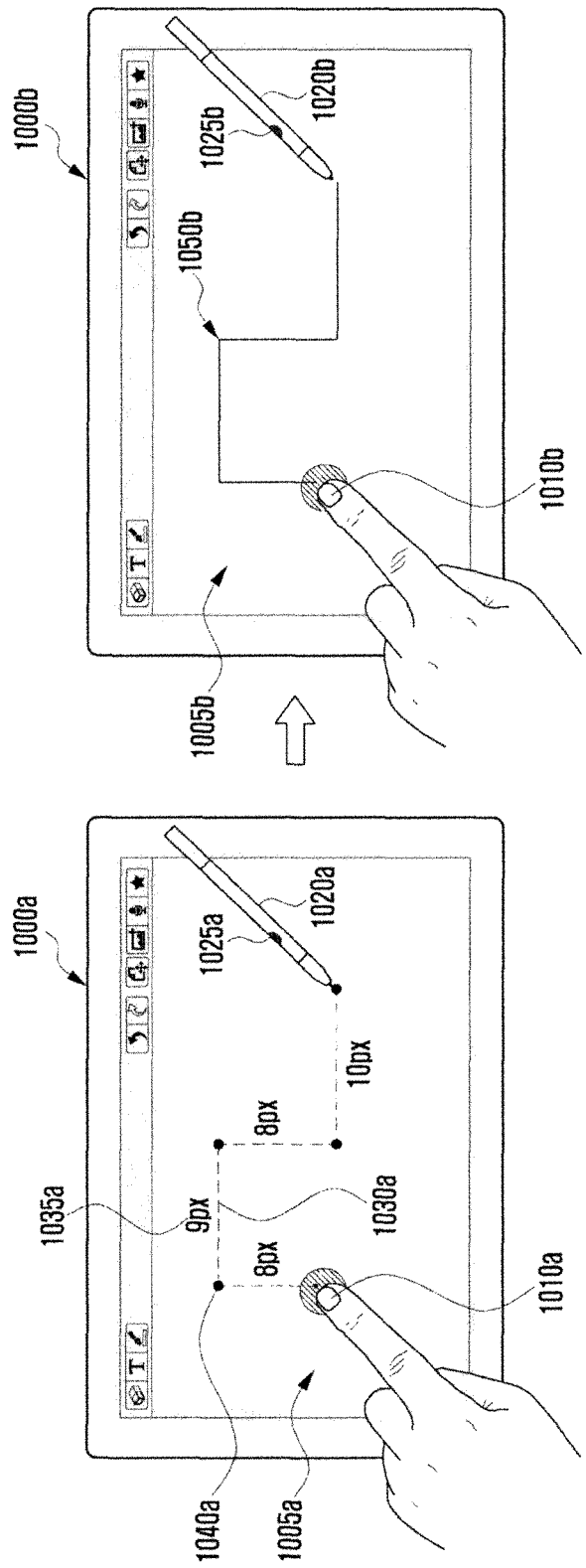
FIG. 10 is a diagram illustrating an exemplary situation of drawing a figure with a touch-based drawing input on the terminal according to an embodiment of the present invention.

FIG. 10 is a diagram illustrating an exemplary situation of drawing a figure with a touch-based drawing input on the terminal according to one embodiment of the present invention.

Referring to FIG. 10, the user may make a touch gesture with the first input tool 1010 and the second input tool 1020 on the display unit 1005 of the terminal 1000.

The first input tool 1010 may make a touch input, and the second input tool 1020 makes another input or electrical input onto the terminal 1000. The electrical input is typically generating one of distinct electrical vibrations to the terminal 1000. The distinct electrical vibrations are generated selectively by selector 1025.

In this embodiment, if a touch gesture is made with the first and second input tools 1020a and 1020b, the control unit 230 controls the terminal 1000 to display the supplementary information 1035a and 1040a and the indication line 1030a. The indication line 1030a may be a dotted line connecting the contact points of the touch gesture. The supplementary information 1035a and 1040a may include the dotted line circle having the indication line as its radius and the length information on the indication line. The supplementary information 1035a and 1040a may vary as the contact points of the touch gesture change.

If a user's selection command is made to select the indication line 1035a, the dotted indication line 1035a is changed for the solid indication line 1035b. The selected indication line 1035b may be the segment connecting the two end points of the touch made for generating the selection command. The supplementary information 1035b and 1040b may be displayed even after the input of the selection command. The selection command may be generated in such a way of clicking the selector 1025b and or releasing the contact of one of the first and second input tools 1010b and 10120b.

According to the selection command, the line drawn with the second input tool 1020b may be changed for a solid line 1050b.

According to one embodiment of the present invention, the terminal 1000a may detect a touch gesture having plural contact points in the state that the selector 1025 is on. Whenever a touch gesture having plural contact points is detected, the corresponding indication line 1030a and supplementary information 1035a and 1040a are as shown. Afterward, if the selector 1025b is off, the indication line 1030a is changed for the solid indication line 1050b.

The drawing input method and apparatus of the present invention is capable of allowing the user to draw a figure such as line, circle, and arc selectively without any drawing mode selection step. The drawing input method and apparatus is capable of facilitating touch-based input for drawing a figure by providing assistive information such as dotted line such that the user can draw a figure in intended shape and size.

The drawing input method and apparatus of the present invention is capable of selecting one of various input methods without changing the contact point of an input tool making an electrical touch input such as tablet pen and drawing a figure such as line, circle, and arc in a seamless manner, resulting in improvement of manipulation efficiency.

It is to be appreciated that those skilled in the art can change or modify the embodiments without departing the technical concept of this invention. Accordingly, it should be understood that above-described embodiments are essentially for illustrative purpose only but not in any way for restriction thereto. Thus the scope of the invention should be determined by the appended claims and their legal equivalents rather than the specification, and various alterations and modifications within the definition and scope of the claims are included in the claims.

The above-described methods according to the present invention can be implemented in hardware, firmware or via execution of software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. §101 and does not constitute software per se.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

What is claimed is:

1. A method for drawing a figure on a screen of an electronic device, the method comprising: receiving a first touch input on the screen of the electronic device during a first time period; displaying guide information comprising at least one line, wherein the at least one line defines a bounded region on the screen, in response to receiving the first touch input; receiving a second touch input on the screen of the electronic device during a second time period, the second time period overlapping the first time period; displaying a first line responsive to receiving the second touch input based on the guide information, a length of the first line being changeable responsive to receiving the second touch input, wherein the first line is adjacent to the guide information; and displaying supplemental information related to the first line in the bounded region on the screen responsive to receiving the second input, the supplemental information including a numeric measurement related to the first line, the supplemental information being changeable responsive to receiving the second touch input.

2. The method of claim 1, wherein the numeric measurement includes a value corresponding to the length of the first line.

3. The method of claim 1, wherein the guide information includes information on length based on the at least one line.

4. The method of claim 1, wherein the guide information comprises information indicative of the first line.

5. The method of claim 1, wherein the first line is formed from the at least one line.

6. The method of claim 1, wherein the second touch input comprises a gesture, and wherein displaying the first line further comprises displaying the first line according to the gesture.

7. The method of claim 1, further comprising receiving a selection input related to the second input; and displaying the first line being fixed in response to the selection input.

8. The method of claim 7, further comprising: removing at least one of the guide information and the supplemental information from the screen of the electronic device in response to the selection input.

9. The method of claim 1, wherein the first touch input is movable, and wherein the guide information is moveable according to movements of the first touch input.

10. The method of claim 1, wherein at least a portion of the guide information is replaced by the first line.

11. The method of claim 1, wherein the first line contacts the guide information.

12. The method of claim 1, wherein as the touch input is dragged from a first point to a second point, the guide information is stationary.

13. A non-transitory computer-readable medium storing a plurality of instructions, wherein execution of the plurality of instructions by one or more processors causes performance of the method of claim 1.

14. An electronic device, the electronic device comprising;
an input unit configured to receive at least one touch input;
a display configured to display at least one information; and
a control unit configured to control:
receiving, by the input unit, a first touch input on a screen of the electronic device during a first time period;
displaying, by the display, guide information comprising at least one line, wherein the at least one line defines a bounded region on the screen, in response to receiving the first touch input
receiving, by the input unit, a second touch input during a second time period, the second time period overlapping the first time period;
displaying, by the display, a first line responsive to receiving the second touch input based on the guide information, a length of the first line being changeable responsive to receiving the second touch input, wherein the first line is adjacent to the guide information; and
displaying, by the display, supplemental information related to the first line in the bounded region on the screen responsive to receiving the second input, the supplemental information including a numeric measurement related to the first line, the supplemental information being changeable responsive to receiving the second touch input.

15. The electronic device of claim 14, wherein the numeric measurement includes a value corresponding to the length of the first line.

16. The electronic device of claim 14, wherein the guide information includes information on length for the at least one line.

17. The electronic device of claim 14, wherein the guide information comprises information indicative of the first line.

18. The electronic device of claim 14, wherein the first line is formed from the at least one line.

19. The electronic device of claim 14, wherein the second touch input comprises a gesture, and wherein displaying the first line further comprises displaying the first line according to the gesture.

20. The electronic device of claim 14, wherein the control unit is further configured to control: receiving, by the input unit, a selection input related to the second input; and displaying, by the display, the first line being fixed in response to the selection input.

21. The electronic device of claim 20, wherein the control unit is further configured to control: removing, by the display, at least one of the guide information and the supplemental information from the screen of the electronic device in response to the selection input.

22. The electronic device of claim 14, wherein the first touch input is movable, and wherein the guide information is moveable according to movements of the first touch input.

* * * * *